(12) United States Patent
Chiang

(10) Patent No.: US 12,085,144 B1
(45) Date of Patent: Sep. 10, 2024

(54) ROPE BUCKLE ASSEMBLY

(71) Applicant: NIFCO TAIWAN CORPORATION, Taoyuan (TW)

(72) Inventor: Wen-Ching Chiang, Taoyuan (TW)

(73) Assignee: NIFCO TAIWAN CORPORATION, Taoyuan (TW)

( * ) Notice: Subject to any disclaimer, the term of this patent is extended or adjusted under 35 U.S.C. 154(b) by 0 days.

(21) Appl. No.: 18/331,130

(22) Filed: Jun. 7, 2023

(30) Foreign Application Priority Data

Mar. 15, 2023 (TW) .................................. 112202263

(51) Int. Cl.
*F16G 11/10* (2006.01)
(52) U.S. Cl.
CPC .................................. *F16G 11/101* (2013.01)
(58) Field of Classification Search
CPC ..... F16G 11/101; A43C 7/00; Y10T 24/3984; Y10T 24/3713; Y10T 24/39
See application file for complete search history.

(56) References Cited

U.S. PATENT DOCUMENTS

| D465,408 S | * | 11/2002 | Man | D8/383 |
| D551,067 S | * | 9/2007 | Kawamura | D8/383 |
| 8,904,605 B2 | * | 12/2014 | Kawaguchi | F16G 11/03 |
| | | | | D8/383 |
| D773,923 S | * | 12/2016 | Ishii | D8/383 |
| D773,924 S | * | 12/2016 | Ishii | D8/383 |
| D793,214 S | * | 8/2017 | Ishii | D8/383 |
| 10,070,694 B2 | * | 9/2018 | Schreiner | A43C 7/00 |
| D831,461 S | * | 10/2018 | Jarrett | D8/333 |
| 10,440,901 B2 | * | 10/2019 | Eaton | A01G 9/122 |
| 10,512,304 B2 | * | 12/2019 | Nussbaum | A43C 7/08 |
| 10,595,581 B2 | * | 3/2020 | Nussbaum | G01P 15/18 |
| 11,122,867 B1 | * | 9/2021 | Ajaj | A44C 5/2052 |
| D954,547 S | * | 6/2022 | Zhang | D8/383 |
| 11,421,755 B2 | * | 8/2022 | Brezzi | F16G 11/103 |
| 11,644,083 B1 | * | 5/2023 | Jarrett | F16G 11/101 |
| | | | | 24/712.7 |
| 11,937,666 B2 | * | 3/2024 | Nussbaum | A43B 3/34 |
| 2015/0096158 A1 | * | 4/2015 | Shattuck | A43C 7/00 |
| | | | | 24/712.1 |

* cited by examiner

*Primary Examiner* — Robert Sandy
*Assistant Examiner* — Louis A Mercado
(74) *Attorney, Agent, or Firm* — Li & Cai Intellectual Property Office

(57) ABSTRACT

A rope buckle assembly includes a female buckle and a male buckle. The female buckle has an accommodating slot and a plurality of openings that are in spatial communication with the accommodating slot. The accommodating slot has two guiding surfaces protruding from a slot bottom thereof, and the openings are respectively arranged at two opposite side of the accommodating slot and respectively face toward each other. The male buckle includes two rigid arms and a deformable segment that connects the two rigid arms. When the male buckle is inserted into the female buckle, the two rigid arms swing toward each other to jointly compress and deform the deformable segment by respectively abutting against the two guiding surfaces, so that a through hole of each of the two rigid arms corresponds in position to two of the openings facing each other for jointly defining a rope channel.

10 Claims, 10 Drawing Sheets

ROPE BUCKLE ASSEMBLY

CROSS-REFERENCE TO RELATED PATENT APPLICATION

This application claims the benefit of priority to Taiwan Patent Application No. 112202263, filed on Mar. 15, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a buckle, and more particularly to a rope buckle assembly.

BACKGROUND OF THE DISCLOSURE

A conventional rope buckle assembly includes a female buckle and a male buckle that is inserted into the female buckle along an insertion direction, where an elastic segment of the male buckle is operated and deformed along the insertion direction. However, since a shape of the elastic segment is limited by the direction of deformation (e.g., the insertion direction), a structural development of the male buckle is limited and difficult to be improved.

SUMMARY OF THE DISCLOSURE

In response to the above-referenced technical inadequacies, the present disclosure provides a rope buckle assembly to effectively improve on the issues associated with conventional rope buckle assemblies.

In order to solve the above-mentioned problems, one of the technical aspects adopted by the present disclosure is to provide a rope buckle assembly, which includes a female buckle and a male buckle. The female buckle surroundingly forms an accommodating slot that has two guiding surfaces protruding from a slot bottom of the accommodating slot. The female buckle has two first openings arranged on one side thereof and in spatial communication with the accommodating slot and two second openings that are arranged on another side thereof and that are in spatial communication with the accommodating slot. The two first openings respectively face toward the second openings along a through direction. The male buckle is inserted into the accommodating slot along an insertion direction perpendicular to the through direction so as to be arranged at an initial position. The male buckle includes a pressing segment, two rigid arms, and a deformable segment. The pressing segment has a pressing surface exposed from the accommodating slot. The two rigid arms are connected to the pressing segment and are inserted into the accommodating slot. The two rigid arms are spaced apart from each other along an arrangement direction perpendicular to the through direction and the insertion direction, and each of the two rigid arms has a through hole. The deformable segment is connected to a bottom side of the pressing segment and is connected in-between the two rigid arms. Moreover, a bottom side of the deformable segment defines a notch located between the through holes of the two rigid arms. Along the through direction, a thickness of the deformable segment is less than a thickness of any one of the two rigid arms. When the male buckle and the female buckle jointly receive an external force to cause the male buckle to move relative to the female buckle from the initial position to a through position, the two rigid arms swing toward each other to jointly compress and deform the deformable segment by respectively abutting against the two guiding surfaces, such that the through hole of each of the two rigid arms corresponds in position to one of the two first openings and the corresponding second opening for jointly defining a rope channel that is configured to allow a rope to pass therethrough.

Therefore, in the rope buckle assembly provided by the present disclosure, the structural design of the male buckle and the cooperation between the male buckle and the female buckle can allow the two rigid arms to compress the deformable segment after abutting against the two guiding surfaces of the female buckle, so that the two rigid arms can swing toward each other through the deformation of the deformable segment, thereby providing an architecture different from that of the conventional rope buckle assemblies.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
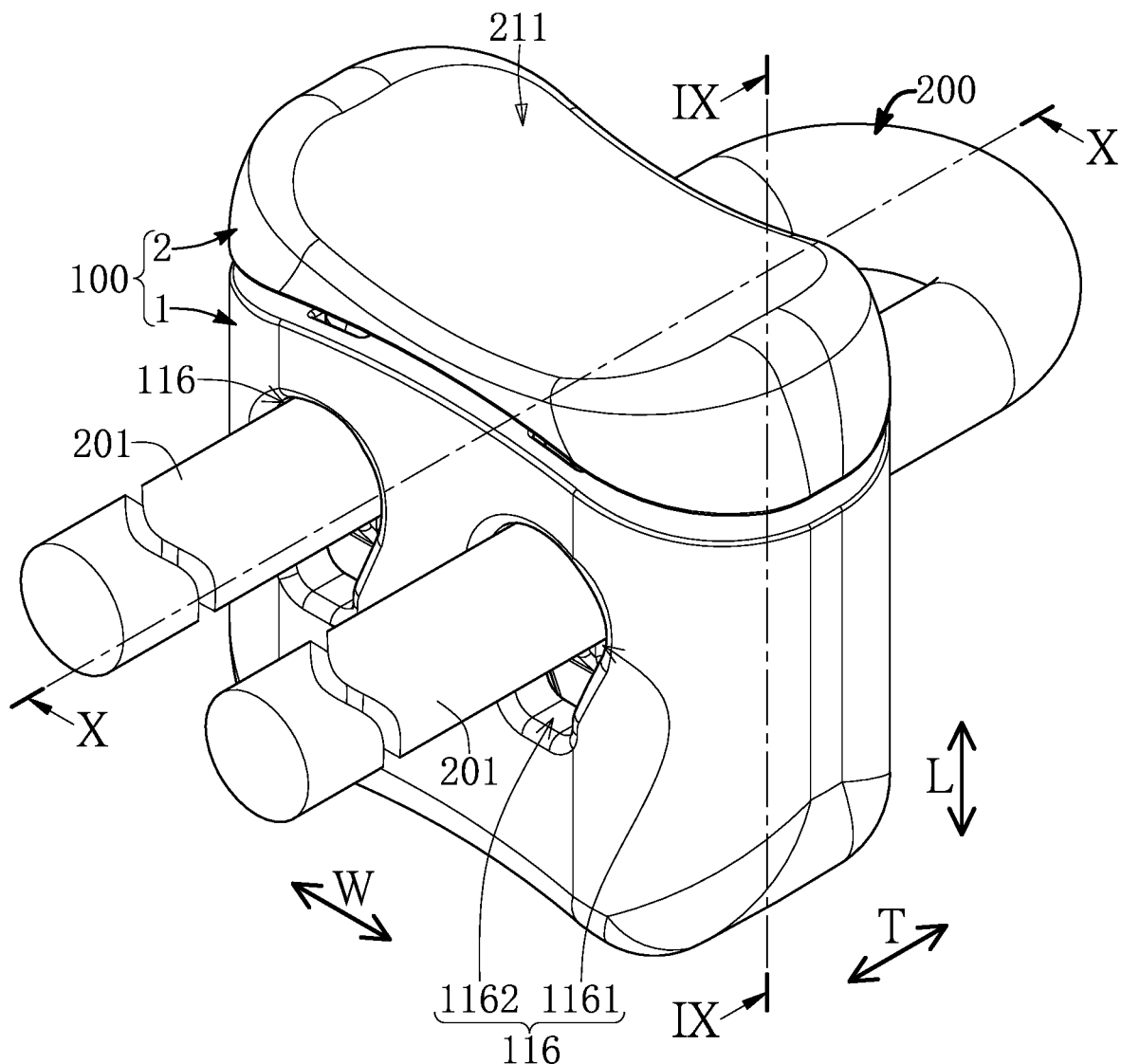
FIG. 1 is a schematic perspective view of a rope buckle assembly in cooperation with a rope according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 10, an embodiment of the present disclosure is provided. As shown in FIG. 1, the present embodiment provides a rope buckle assembly 100 configured for two segments 201 of a rope 200 to pass therethrough and to be positioned therein. The rope buckle assembly 100 includes a female buckle 1 and a male buckle 2 that is inserted into the female buckle 1 along an insertion direction L. Any one of the female buckle 1 and the male buckle 2 in the present embodiment is integrally formed as a single one-piece structure and can be made of plastic material, but the present disclosure is not limited thereto.

It should be noted that in order to clearly describe connection relationships between the female buckle 1 and the male buckle 2 provided by the present embodiment, the rope buckle assembly 100 further defines a through direction T and an arrangement direction W, where the insertion direction L, the through direction T, and the arrangement direction W are perpendicular to each other.

Figure 2:
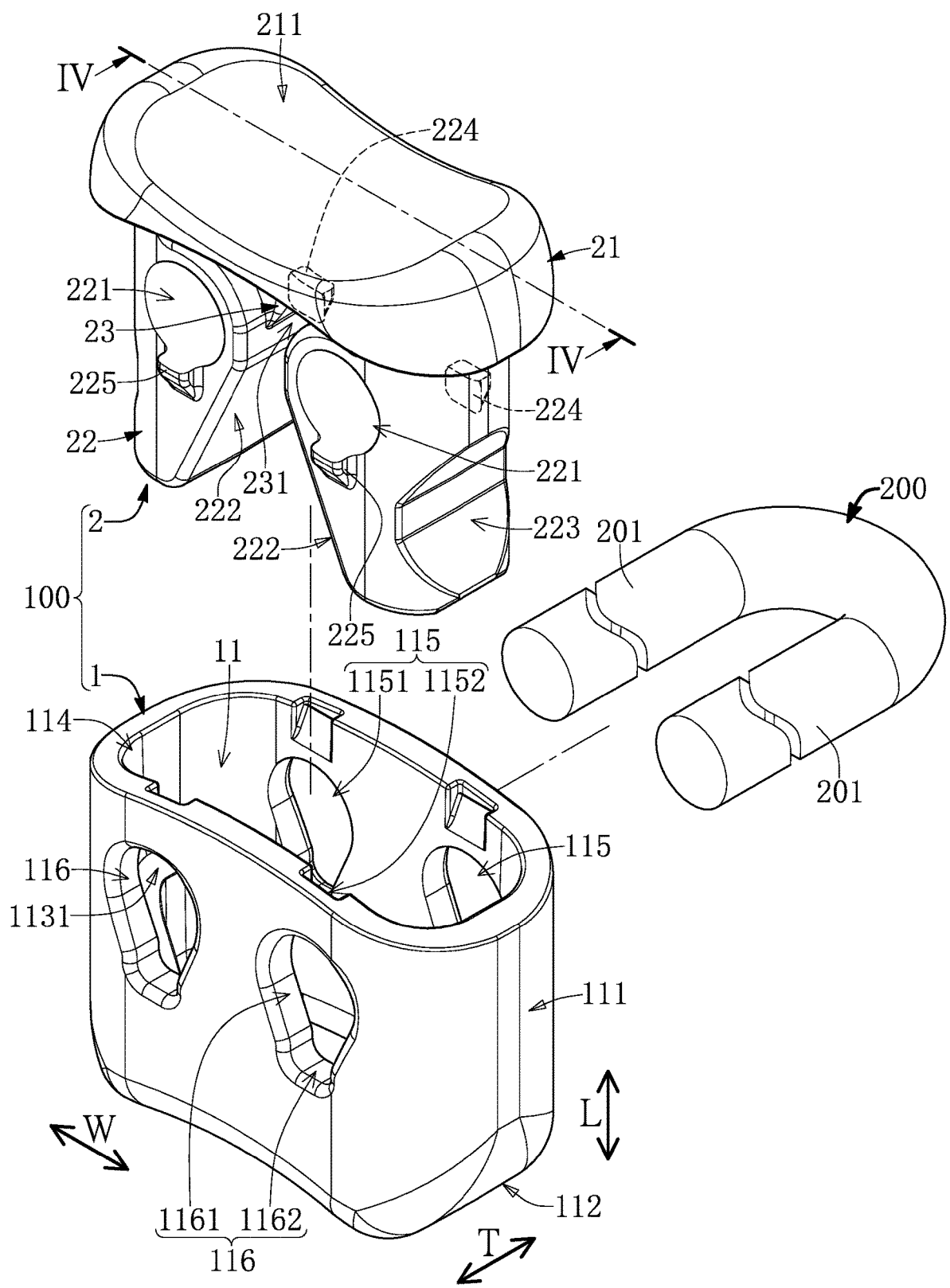
FIG. 2 is a schematic exploded view of FIG. 1.
Figure 3:
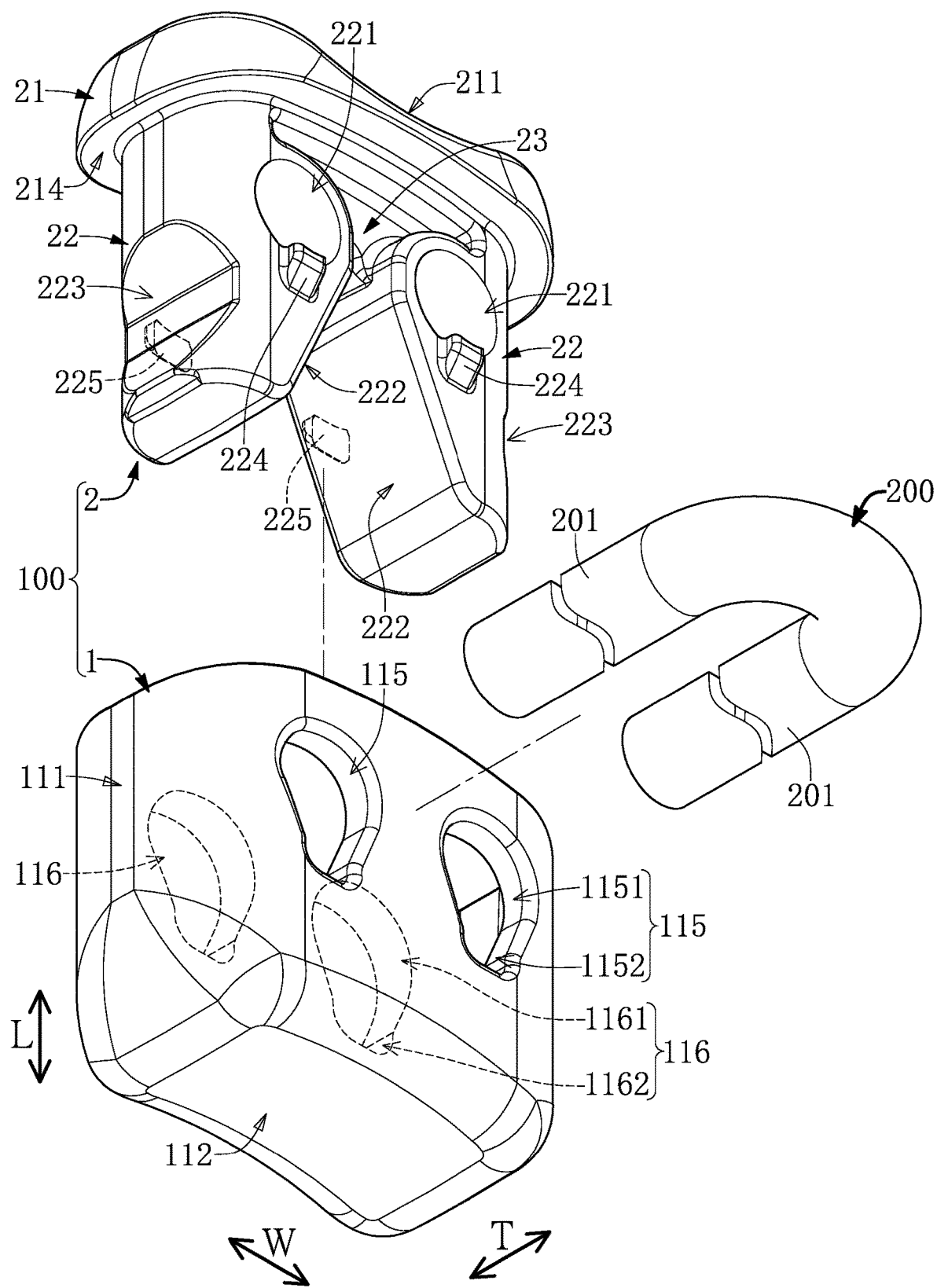
FIG. 3 is a schematic exploded view of FIG. 1 from another angle of view.
Figure 4:
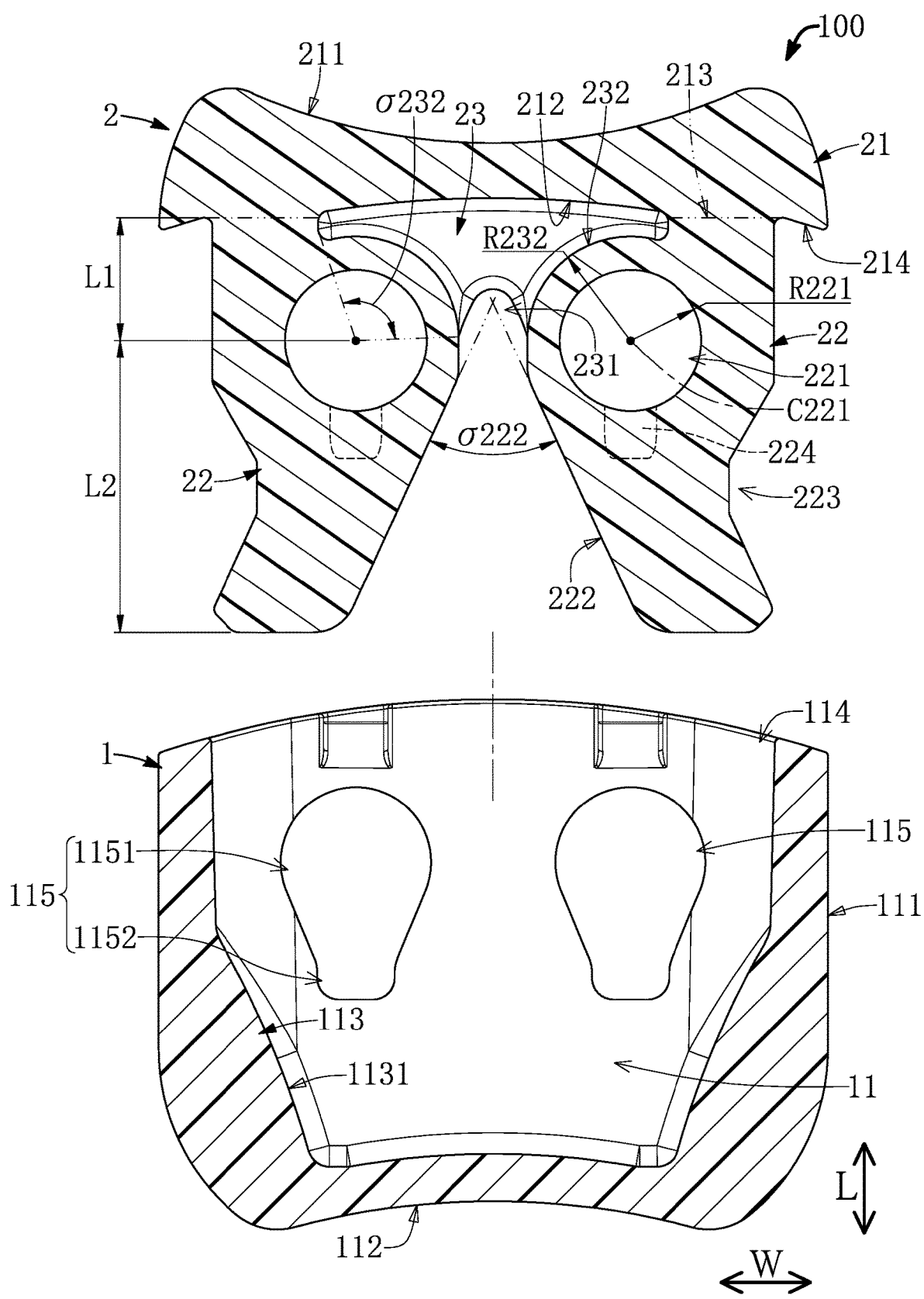
FIG. 4 is a schematic cross-sectional view taken along line IV-IV of FIG. 2.

As shown in FIG. 2 to FIG. 4, the female buckle 1 surroundingly forms (or defines) an accommodating slot 11. The accommodating slot 11 in the present embodiment has a surrounding side wall 111, a slot bottom 112 (perpendicularly) connected to one end of the surrounding side wall 111, and two guiding blocks 113 that are formed on the slot bottom 112. Moreover, a slot opening 114 of the accommodating slot 11 is formed on another end of the surrounding side wall 111. In other words, a top side of the female buckle 1 (or the surrounding side wall 111) defines the slot opening 114 of the accommodating slot 11.

Furthermore, the female buckle 1 (or the surrounding side wall 111) has two first openings 115 arranged on one lateral side thereof and in spatial communication with the accommodating slot 11 and two second openings 116 that are arranged on another lateral side thereof and that are in spatial communication with the accommodating slot 11. Specifically, the two first openings 115 and the second openings 116 penetrate through the surrounding side wall 111, and the two first openings 115 respectively face toward the second openings 116 along the through direction T.

In the present embodiment, the two first openings 115 are of substantially the same shape and are arranged along the arrangement direction W, and inner walls of the two first openings 115 are respectively flush with inner walls of the two second openings 116 along the through direction T (i.e., the shape of each of the two first openings 115 is identical to the shape of the corresponding second opening 116), but the present disclosure is not limited thereto. For example, in other embodiments of the present disclosure not shown in the drawings, the two first openings 115 can have different shapes; or, each of the two first openings 115 and the corresponding second opening 116 can have different shapes.

Specifically, each of the two first openings 115 in the present embodiment has a first through region 1151 and a first limiting region 1152 that is in spatial communication with the first through region 1151 along the insertion direction L. In each of the two first openings 115, an inner diameter of the first through region 1151 is greater than an inner diameter of the first limiting region 1152, and the first through region 1151 is arranged closer to the slot opening 114 than the first limiting region 1152.

Moreover, each of the two second openings 116 in the present embodiment has a second through region 1161 and a second limiting region 1162 that is in spatial communication with the second through region 1161 along the insertion direction L. In each of the two second openings 116, an inner diameter of the second through region 1161 is greater than an inner diameter of the second limiting region 1162, and the second through region 1161 is arranged closer to the slot opening 114 than the second limiting region 1162.

In addition, each of the two guiding blocks 113 has a guiding surface 1131 protruding from the slot bottom 112. The guiding surfaces 1131 of the two guiding blocks 113 are spaced apart from each other along the arrangement direction W. Furthermore, a distance between the two guiding surfaces 1131 along the arrangement direction W gradually increases in a direction away from the slot bottom 112.

In the present embodiment, each of the two guiding surfaces 1131 is a curved surface (e.g., a convex surface shown in the drawings), and the two guiding surfaces 1131 are mirror symmetrical to each other, but the two guiding surfaces 1131 can be adjusted or changed according to design requirements and are not limited by the present embodiment. For example, in other embodiments of the present disclosure not shown in the drawings, the two guiding surfaces 1131 can be of different structures, and the guiding surface 1131 can be a flat surface or a concave surface.

Figure 5:
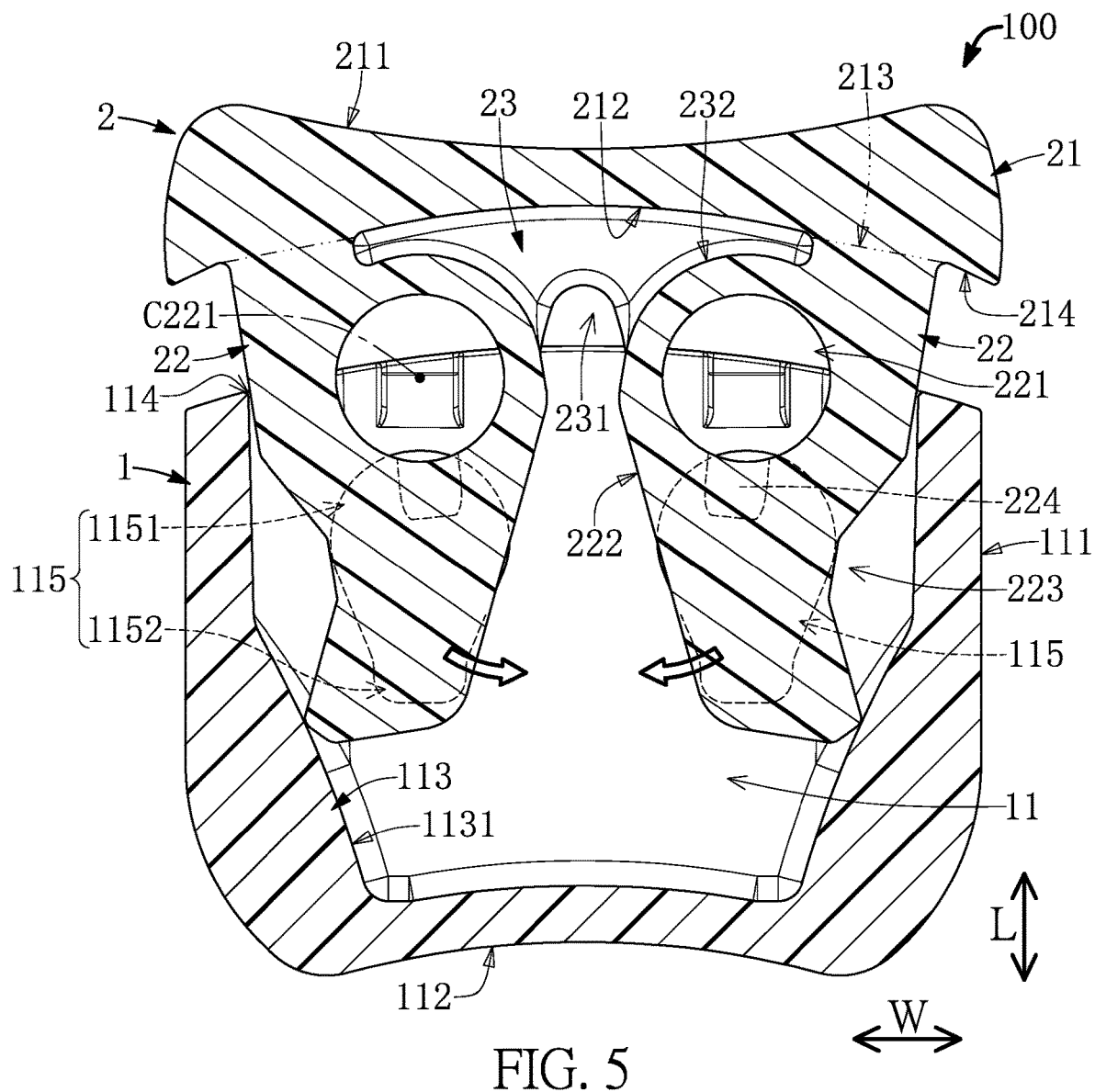
FIG. 5 is a schematic cross-sectional view showing the rope buckle assembly arranged at an initial position.
Figure 6:
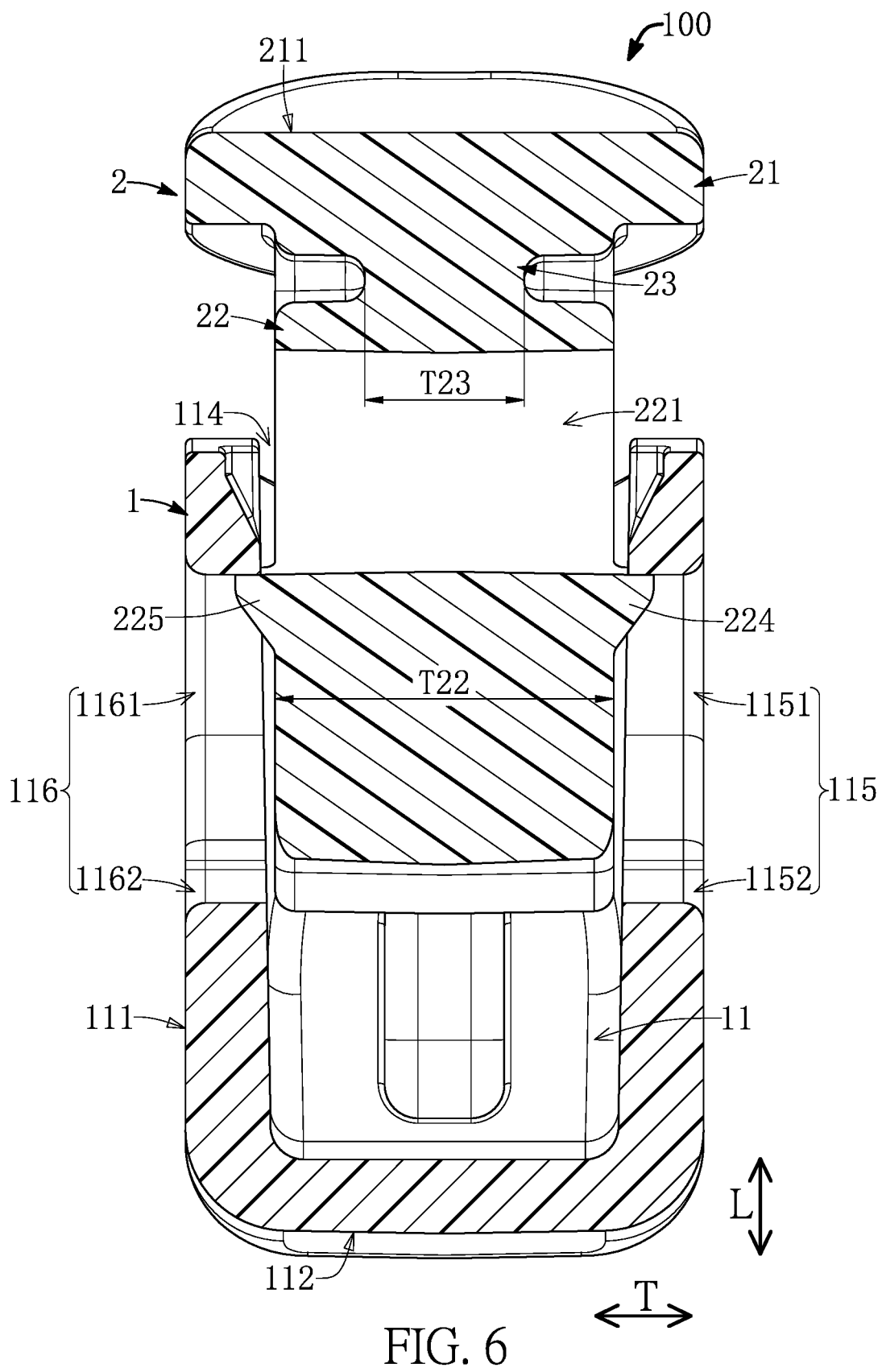
FIG. 6 is a schematic cross-sectional view showing the rope buckle assembly arranged at the initial position from another angle of view.
Figure 7:
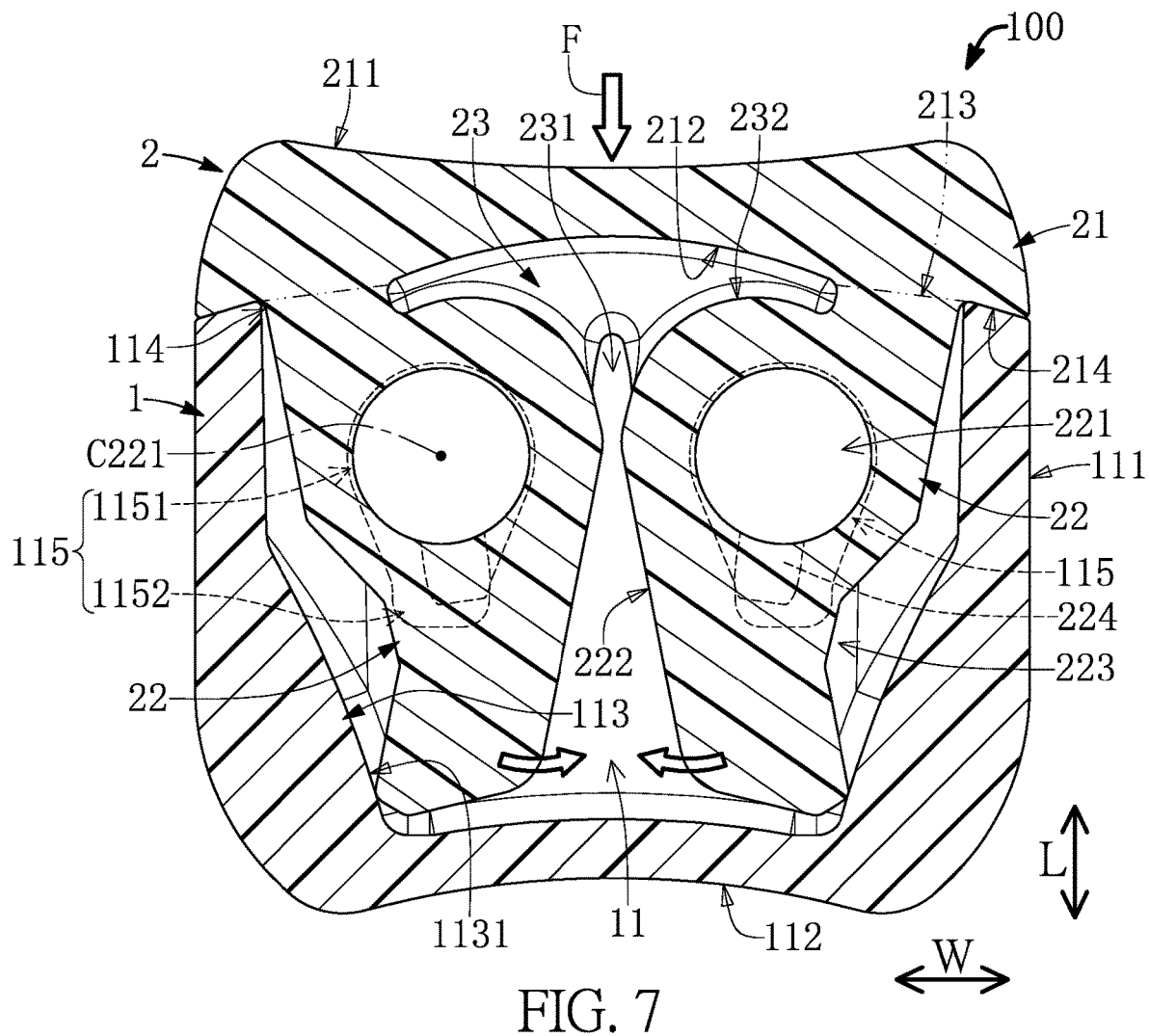
FIG. 7 is a schematic cross-sectional view showing the rope buckle assembly arranged at a through position.
Figure 8:
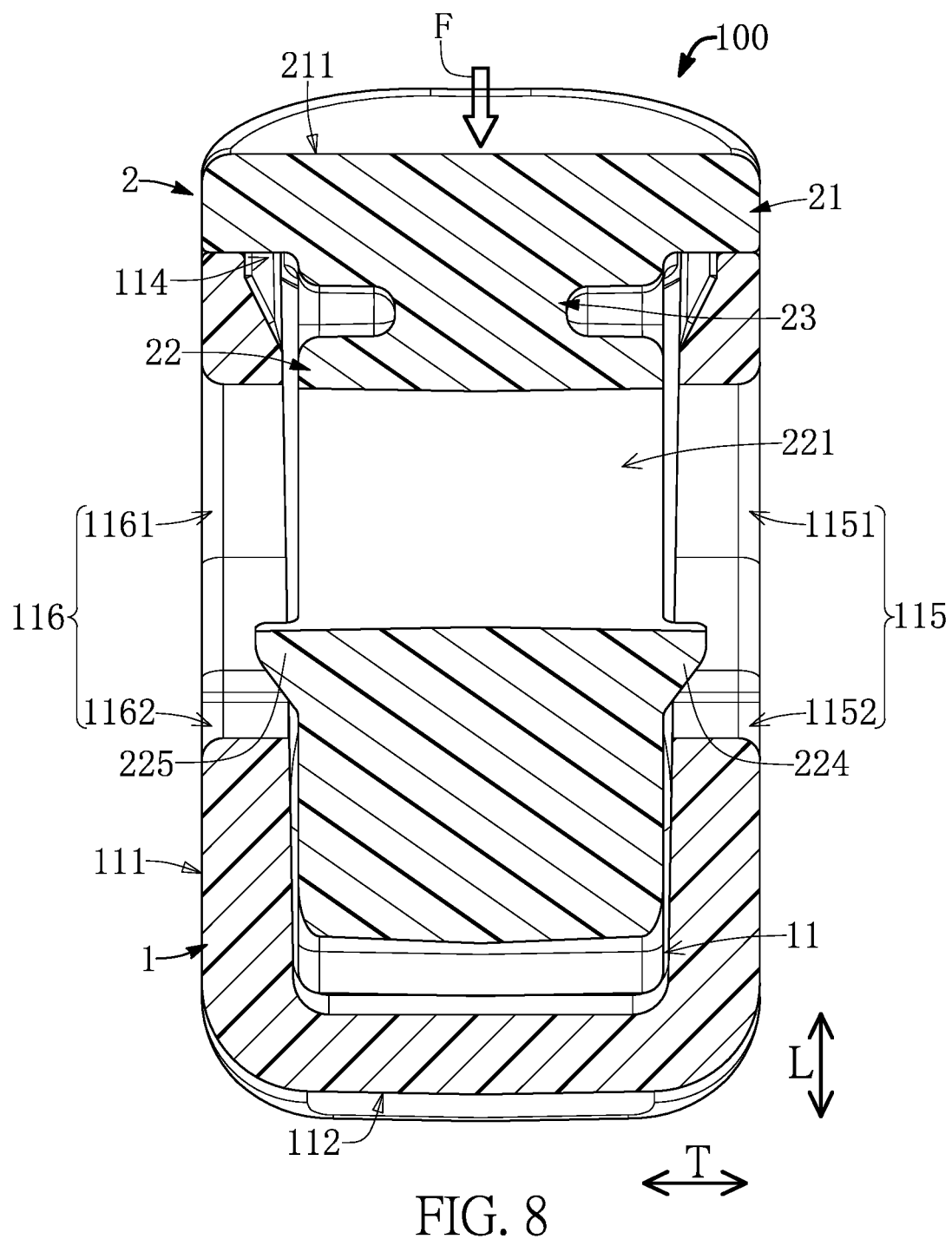
FIG. 8 is a schematic cross-sectional view showing the rope buckle assembly arranged at the through position from another angle of view.
Figure 9:
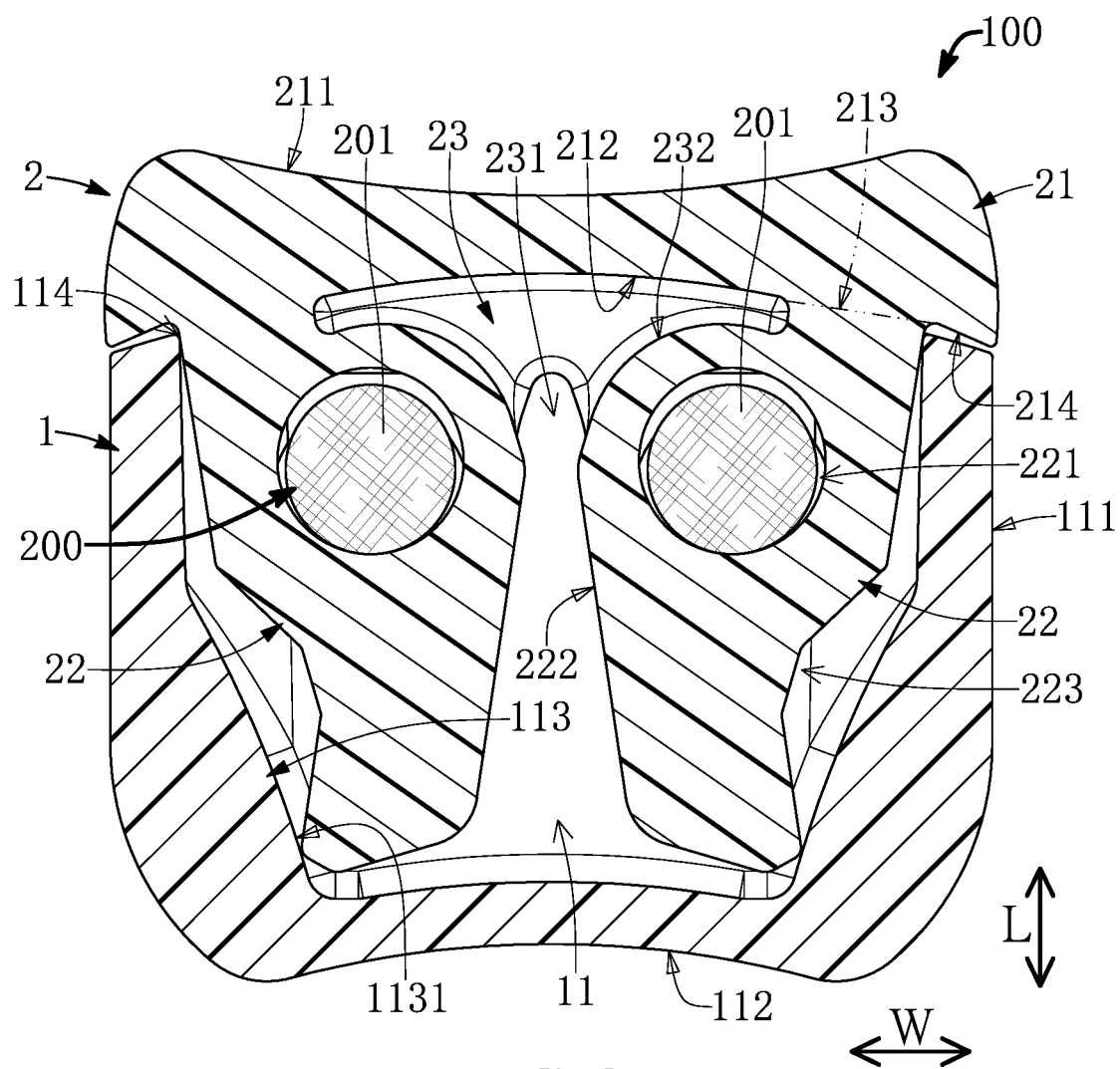
FIG. 9 is a schematic cross-sectional view taken along line IX-IX of FIG. 1.
Figure 10:
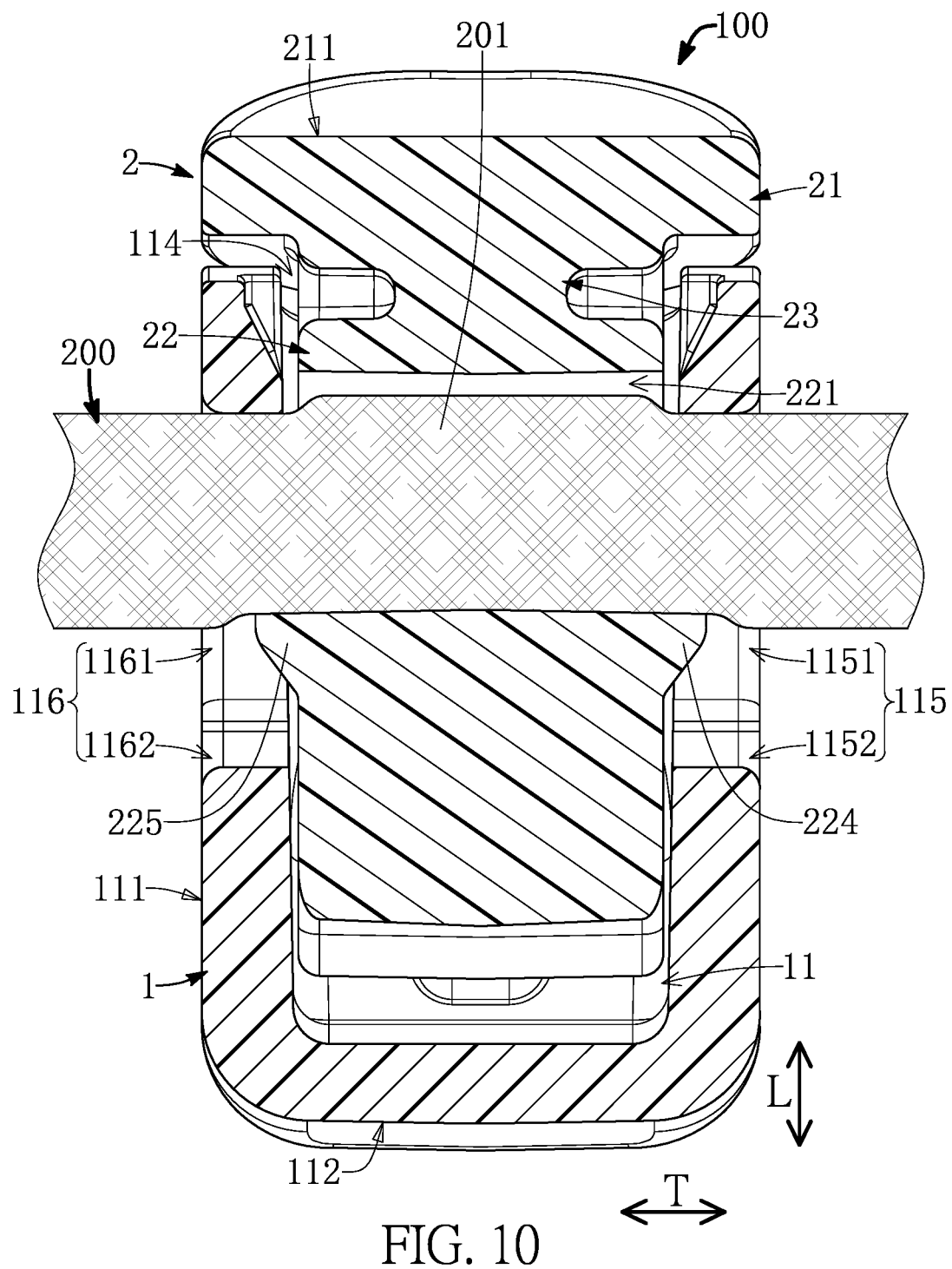
FIG. 10 is a schematic cross-sectional view taken along line X-X of FIG. 1.

The male buckle 2 is assembled to the female buckle 1 by being inserted into the accommodating slot 11 along the insertion direction L, so that the male buckle 2 has a slight deformation relative to an original structure thereof (as shown in FIG. 4) and is arranged at an initial position (as shown in FIG. 5 and FIG. 6). The male buckle 2 can be moved from the initial position to a through position (as shown in FIG. 7 and FIG. 8) by receiving an external force F, and the male buckle 2 can be moved from the through position to a clamping position (as shown in FIG. 9 and FIG. 10) after the external force F is removed. It should be noted that in order to clearly describe the male buckle 2 provided by the present embodiment, the following description describes the original structure of the male buckle 2 that is not deformed, and then describes changes to the male buckle 2 that is deformed.

As shown in FIG. 2 to FIG. 4, the male buckle 2 includes a pressing segment 21, two rigid arms 22 connected to the pressing segment 21, and a deformable segment 23. The deformable segment 23 is connected to a bottom side of the pressing segment 21 and is connected in-between top portions of the two rigid arms 22. The pressing segment 21, the two rigid arms 22, and the deformable segment 23 in the present embodiment are connected to each other and are jointly formed as a substantial x-shaped structure, but the present disclosure is not limited thereto.

Specifically, the pressing segment 21 is exposed from (or arranged outside of) the accommodating slot 11, the two rigid arms 22 are preferably mirror symmetrical to each other and are inserted into the accommodating slot 11, and the two rigid arms 22 and the deformable segment 23 are substantially located in a space defined by orthogonally projecting the pressing segment 21 toward the slot bottom 112, but the present disclosure is not limited thereto.

The pressing segment 21 has a pressing surface 211 exposed from the accommodating slot 11 and arranged away from the slot bottom 112. The bottom side of the pressing segment 21 has a first region 212, two second regions 213 respectively connected to two opposite outer sides of the first region 212, and an annular region 213 that surrounds the first region 212 and the two second regions 213. Moreover, the first region 212 is connected to the deformable segment 23, and the two second regions 213 are respectively connected to the top portions of the two rigid arms 22. In other words, the first region 212 is arranged in-between the two second regions 213.

In addition, along the arrangement direction W, a length of the first region 212 can be greater than a sum of lengths of the two second regions 213. In other words, along the arrangement direction W, portions of the two rigid arms 22 connected to the pressing segment 21 are shorter than a portion of the deformable segment 23 connected to the pressing segment 21, which can be adjusted or changed according to design requirements, and the present disclosure is not limited thereto.

The two rigid arms 22 are spaced apart from each other along the arrangement direction W, and are respectively connected to two ends (e.g., the two second regions 213) of the bottom side of the pressing segment 21. Each of the two rigid arms 22 in the present embodiment cannot be deformed and has a through hole 221 (having a circular shape). Along the insertion direction L, a distance L1 between a top side of the rigid arm 22 and a center C221 of the through hole 221 is less than a distance L2 between a bottom side of the rigid arm 22 and the center C221 of the through hole 221.

Specifically, each of the two rigid arms 22 has a slanting surface 222 arranged on an inner side thereof. The slanting surfaces 222 of the two rigid arms 22 face toward each other along the arrangement direction W, and a distance between the slanting surfaces 222 of the two rigid arms 22 (along the arrangement direction W) gradually decreases in a direction away from the slot bottom 112. Furthermore, imaginary extensions of the slanting surfaces 222 of the two rigid arms 22 intersect in a space between the two rigid arms 22 and have an angle σ222 therebetween within a range from 30 degrees to 60 degrees.

Moreover, each of the two rigid arms 22 has a cavity 223 that is recessed in an outer side thereof and that corresponds in position to the slanting surface 222 along the arrangement direction W. The cavity 223 of each of the two rigid arms 22 is located outside of a projection space defined by orthogonally projecting the through hole 221 toward the slot bottom 112 along the insertion direction L.

A bottom side of the deformable segment 23 defines a notch 231 located between the through holes 221 of the two rigid arms 22. The notch 231 is located between upper half portions of the through holes 221 along the arrangement direction W. Specifically, the imaginary extensions of the slanting surfaces 222 of the two rigid arms 22 in the present embodiment are intersected in a space surroundingly defined by the notch 231, but the present disclosure is not limited thereto.

The deformable segment 23 has two connection edges 232 that are respectively connected to the two rigid arms 22 and that are respectively connected to two ends of the notch 231. As shown in FIG. 6, along the through direction T, a thickness T23 of the deformable segment 23 is less than a thickness T22 of any one of the two rigid arms 22, and the thickness T23 of the deformable segment 23 is preferably 30% to 80% of the thickness T22 of any one of the two rigid arms 22.

Moreover, as shown in FIG. 2 to FIG. 4 of the present embodiment, each of the two connection edges 232 has an arced shape having a center of circle, where the centers of circles of the two connection edges 232 are respectively overlapped with the centers C221 of the through holes 221 of the two rigid arms 22. Specifically, each of the two connection edges 232 has a central angle σ232 with respect to the center C221 of the corresponding through hole 221, where the central angle σ232 is within a range from 80 degrees to 120 degrees, and a radius R232 of each of the two connection edges 232 is 120% to 160% of a radius R221 of the corresponding through hole 221, but the present disclosure is not limited thereto.

In summary, when the male buckle 2 and the female buckle 1 jointly receive an external force (e.g., the pressing surface 211 is pressed by a user) to cause the male buckle 2 to move relative to the female buckle 1 from the initial position (as shown in FIG. 5 and FIG. 6) to the through position (as shown in FIG. 7 and FIG. 8), the two rigid arms 22 swing toward each other to jointly compress and deform the deformable segment 23 by respectively abutting against the two guiding surfaces 1131, so that the through hole 221 of each of the two rigid arms 22 corresponds in position to one of the two first openings 115 and the corresponding second opening 116 for jointly defining a rope channel that is configured to allow the rope 200 (e.g., one of the two segments 201) to pass therethrough.

Accordingly, in the rope buckle assembly 100 provided by the present embodiment, the structural design of the male buckle 2 and the cooperation between the male buckle 2 and the female buckle 1 can allow the two rigid arms 22 to compress the deformable segment 23 after abutting against the two guiding surfaces 1131 of the female buckle 1, so that the two rigid arms 22 can swing toward each other through the deformation of the deformable segment 23, thereby providing an architecture different from that of the conventional rope buckle assemblies.

Specifically, when the male buckle 2 is moved from the initial position (as shown in FIG. 5 and FIG. 6) to the through position (as shown in FIG. 7 and FIG. 8), the annular region 214 of the bottom side of the pressing segment 21 is aligned with and abuts against the top side of the female buckle 1 by the pressing segment 21 being deformed. In other words, when the male buckle 2 is arranged at the initial position (as shown in FIG. 5 and FIG. 6), the annular region 214 does not correspond in shape to the top side of the female buckle 1. However, when the male buckle 2 is arranged at the through position (as shown in FIG. 7 and FIG. 8), the annular region 214 is deformed corresponding to the deformation of the pressing segment 21, so that the annular region 214 can correspond in shape to the top side of the female buckle 1.

In addition, when the male buckle 2 is arranged at the through position (as shown in FIG. 7 and FIG. 8), the deformable segment 23 is compressed and deformed so as to have an elastic recovery force and to shrink the notch 231. When the external force is removed to cause the male buckle 2 to move from the through position (as shown in FIG. 7 and FIG. 8) to a clamping position (as shown in FIG. 9 and FIG. 10), the deformable segment 23 releases the elastic recovery force to enable a portion of the rope 200 (e.g., the corresponding segment 201) in the rope channel to be clamped and positioned between the female buckle 1 and the male buckle 2.

It should be noted that each of the two rigid arms 22 includes a first protrusion 224 and a second protrusion 225 that is opposite to the first protrusion 224. The first protrusion 224 and the second protrusion 225 of each of the two rigid arms 22 are respectively arranged in the corresponding first opening 115 and the corresponding second opening 116, and respectively have ends being flush with an inner wall of the corresponding through hole 221. Moreover, when the male buckle 2 is moved from the initial position (as shown in FIG. 5 and FIG. 6) to the through position (as shown in FIG. 7 and FIG. 8), the first protrusion 224 of each of the two rigid arms 22 is moved along the insertion direction L from the first through region 1151 to the first limiting region 1152 of the corresponding first opening 115, and the second protrusion 225 of each of the two rigid arms 22 is moved along the insertion direction L from the second through region 1161 to the second limiting region 1162 of the corresponding second opening 116, so that the male buckle 2 can be stably moved in the accommodating slot 11 of the female buckle 1.

BENEFICIAL EFFECTS OF THE EMBODIMENT

In conclusion, in the rope buckle assembly provided by the present disclosure, the structural design of the male buckle and the cooperation between the male buckle and the female buckle can allow the two rigid arms to compress the deformable segment after abutting against the two guiding surfaces of the female buckle, so that the two rigid arms can swing toward each other through the deformation of the deformable segment, thereby providing an architecture different from that of the conventional rope buckle assemblies.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A rope buckle assembly, comprising:
a female buckle surroundingly forming an accommodating slot that has two guiding surfaces protruding from a slot bottom of the accommodating slot, wherein the female buckle has two first openings arranged on one side thereof and in spatial communication with the accommodating slot and two second openings that are arranged on another side thereof and that are in spatial communication with the accommodating slot, and wherein the two first openings respectively face toward the second openings along a through direction; and
a male buckle that is inserted into the accommodating slot along an insertion direction perpendicular to the through direction so as to be arranged at an initial position, wherein the male buckle includes:
a pressing segment having a pressing surface exposed from the accommodating slot;
two rigid arms connected to the pressing segment and inserted into the accommodating slot, wherein the two rigid arms are spaced apart from each other along an arrangement direction perpendicular to the through direction and the insertion direction, and each of the two rigid arms has a through hole; and
a deformable segment connected to a bottom side of the pressing segment and connected in-between the two rigid arms, wherein a bottom side of the deformable segment defines a notch located between the through holes of the two rigid arms, and wherein, along the through direction, a thickness of the deformable segment is less than a thickness of any one of the two rigid arms;
wherein, when the male buckle and the female buckle jointly receive an external force to cause the male buckle to move relative to the female buckle from the initial position to a through position, the two rigid arms swing toward each other to jointly compress and deform the deformable segment by respectively abutting against the two guiding surfaces, such that the through hole of each of the two rigid arms corresponds in position to one of the two first openings and the corresponding second opening for jointly defining a rope channel that is configured to allow a rope to pass therethrough.

2. The rope buckle assembly according to claim 1, wherein the deformable segment has two connection edges that are respectively connected to the two rigid arms and that are respectively connected to two ends of the notch, and wherein each of the two connection edges has an arced shape having a center of circle, where the centers of circles of the two connection edges are respectively overlapped with centers of the through holes of the two rigid arms.

3. The rope buckle assembly according to claim 2, wherein each of the two connection edges has a central angle with respect to the center of the corresponding through hole, where the central angle is within a range from 80 degrees to 120 degrees, and wherein a radius of each of the two connection edges is 120% to 160% of a radius of the corresponding through hole.

4. The rope buckle assembly according to claim 1, wherein, along the through direction, the thickness of the deformable segment is 30% to 80% of the thickness of any one of the two rigid arms.

5. The rope buckle assembly according to claim 1, wherein the bottom side of the pressing segment has a first region and two second regions that are respectively connected to two opposite sides of the first region, and wherein the first region is connected to the deformable segment, and the two second regions are respectively connected to the two rigid arms.

6. The rope buckle assembly according to claim 5, wherein a top side of the female buckle defines a slot opening of the accommodating slot, and the bottom side of the pressing segment has an annular region surrounding the first region and the two second regions, and wherein, when the male buckle is moved from the initial position to the through position, the annular region of the bottom side of the pressing segment is aligned with and abuts against the top side of the female buckle by the pressing segment being deformed.

7. The rope buckle assembly according to claim 1, wherein each of the two first openings has a first through region and a first limiting region that is in spatial communication with the first through region, and each of the two rigid arms includes a first protrusion that is arranged in the corresponding first opening and that has one end being flush with an inner wall of the corresponding through hole, and wherein, when the male buckle is moved from the initial position to the through position, the first protrusion of each of the two rigid arms is moved along the insertion direction from the first through region to the first limiting region of the corresponding first opening.

8. The rope buckle assembly according to claim 1, wherein each of the two rigid arms has a slanting surface arranged on an inner side thereof, and wherein the slanting surfaces of the two rigid arms face toward each other along the arrangement direction, and a distance between the slanting surfaces of the two rigid arms gradually decreases in a direction away from the slot bottom.

9. The rope buckle assembly according to claim 8, wherein imaginary extensions of the slanting surfaces of the two rigid arms intersect in a space surroundingly defined by the notch and have an angle therebetween within a range from 30 degrees to 60 degrees.

10. The rope buckle assembly according to claim 1, wherein, when the male buckle is arranged at the through position, the deformable segment is compressed and deformed so as to have an elastic recovery force and to shrink the notch, and wherein, when the external force is removed to cause the male buckle to move from the through position to a clamping position, the deformable segment releases the elastic recovery force to enable a portion of the rope in the rope channel to be clamped and positioned between the female buckle and the male buckle.

\* \* \* \* \*